United States Patent [19]

Garwick

[11] Patent Number: 5,357,072
[45] Date of Patent: Oct. 18, 1994

[54] WIRE CONSOLIDATOR FOR WIRECUT EDM

[75] Inventor: William M. Garwick, Columbus, Ohio

[73] Assignee: TMTT Enterprises, Inc., Columbus, Ohio

[21] Appl. No.: 37,014

[22] Filed: Mar. 25, 1993

[51] Int. Cl.⁵ .................. B23H 7/02; B23H 11/00; B23D 25/00
[52] U.S. Cl. .................. 219/69.12; 83/167; 83/950
[58] Field of Search ............ 219/69.12; 83/167, 835, 83/950

[56] References Cited

U.S. PATENT DOCUMENTS

| | | | |
|---|---|---|---|
| 3,625,101 | 12/1971 | Leveque | 83/950 |
| 4,242,558 | 12/1980 | Kunze | 219/69.12 |
| 4,417,118 | 11/1983 | Miyano | 219/69.12 |
| 4,706,534 | 11/1987 | Smolders | 83/835 |
| 4,751,364 | 6/1988 | Tobler et al. | 219/69.12 |
| 5,047,607 | 9/1991 | Briffod | 219/69.12 |
| 5,078,032 | 1/1992 | Gerlach | 83/950 |

FOREIGN PATENT DOCUMENTS

| | | | |
|---|---|---|---|
| 56-21732 | 2/1981 | Japan | 219/69.12 |
| 59-64231 | 4/1984 | Japan | 219/69.12 |
| 63-114820 | 5/1988 | Japan | 219/69.12 |
| 3-49831 | 3/1991 | Japan | 219/69.12 |
| 680840 | 11/1992 | Switzerland | 219/69.12 |
| 606663 | 5/1978 | U.S.S.R. | 83/950 |

*Primary Examiner*—Geoffrey S. Evans
*Attorney, Agent, or Firm*—Mueller and Smith

[57] ABSTRACT

Consolidating expended electrode wire by cutting it into predetermined lengths facilitating handling and yielding a salable byproduct rather than mere salvageable scrap. The apparatus is adapted for use in a wirecut EDM machine having an advancing electrode wire, a wire driver assembly for advancing the electrode wire, and a roller assembly for drawing the expended electrode wire from the machine. For cutting the expended wire into predetermined lengths, a wire shearing assembly having at least one shear tip movable along a predetermined locus is provided. The wire shearing assembly is actuable by a drive assembly to move the shear tip at a rate effective to cut the expended wire into predetermined lengths. A guide bushing having a guide opening extending therethrough is interposed between the roller assembly of the EDM machine and the wire shearing assembly to receive the expended wire from the roller assembly and to locate it within the locus for shearing impact with the shear tip.

18 Claims, 3 Drawing Sheets

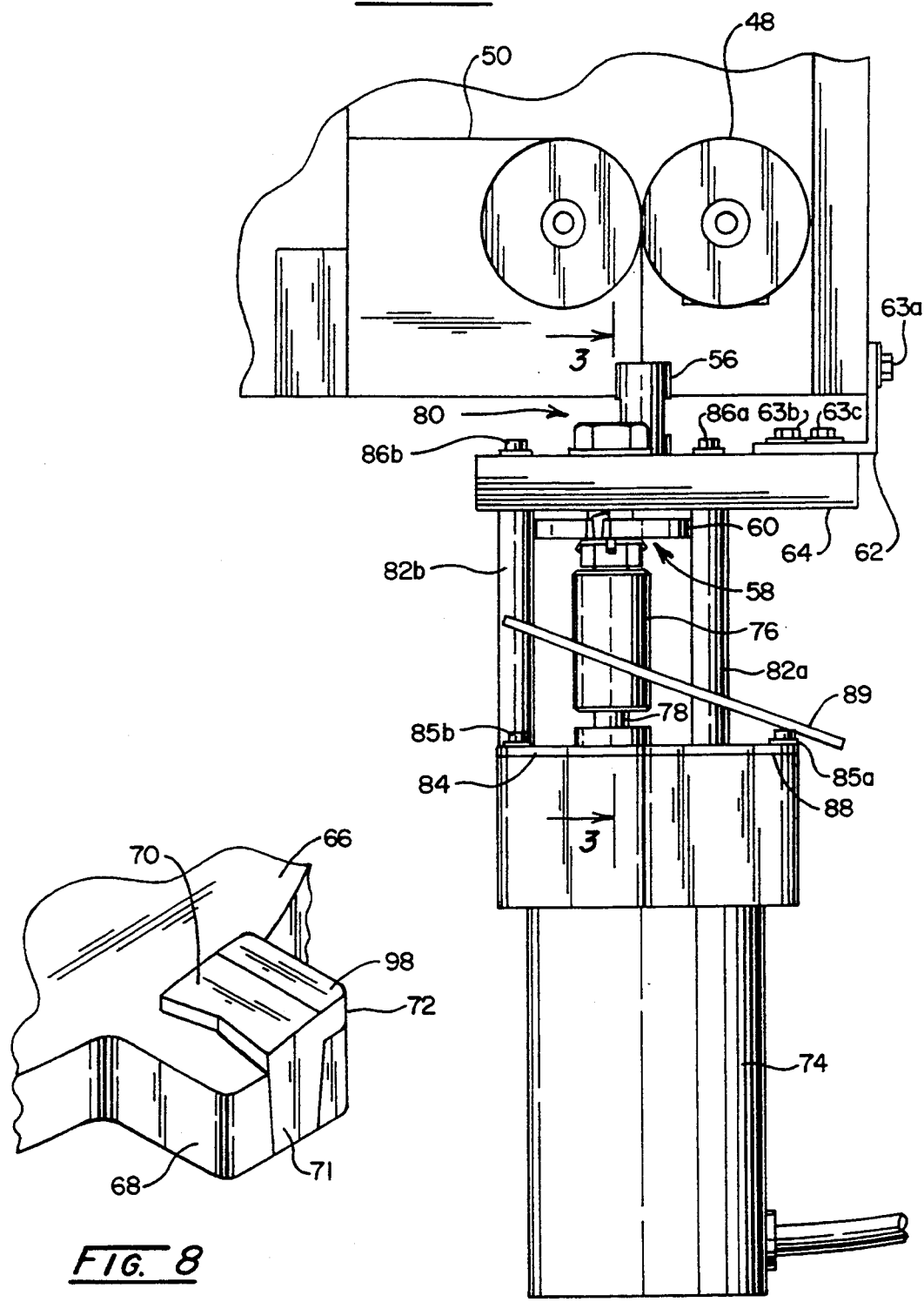

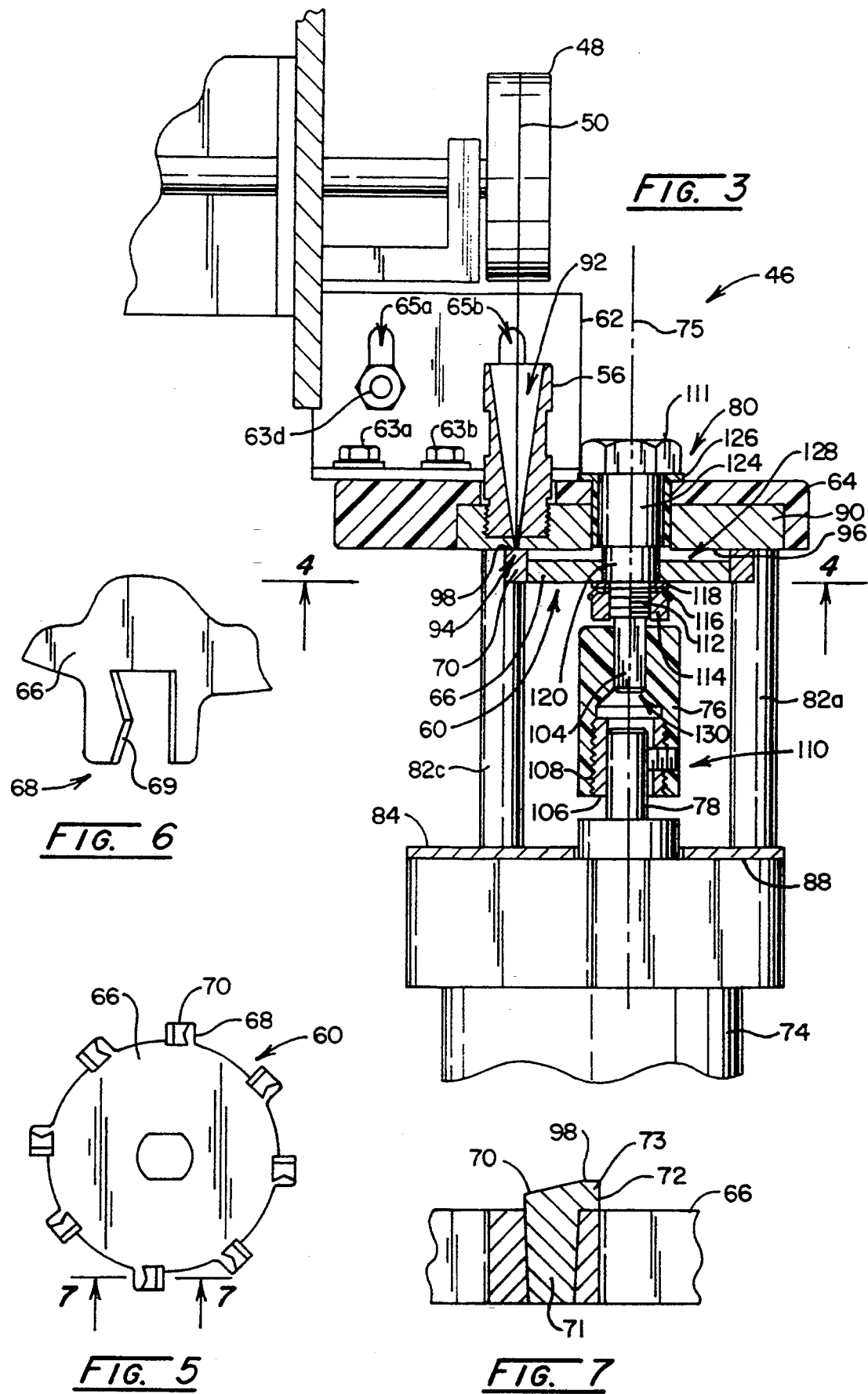

WIRE CONSOLIDATOR FOR WIRECUT EDM

BACKGROUND OF THE INVENTION

The present invention relates broadly to a wire consolidator for an electrode discharge machining (EDM) machine which consolidates expended electrode wire by cutting it into predetermined lengths as it is drawn from the EDM machine.

EDM is a process whereby precision tools, dies, parts, and the like may be produced both quickly and accurately via the erosion of material from a conductive workpiece by a controlled electrical spark from an electrode. Inasmuch as there is no direct physical contact between the workpiece and the electrode and no physical force is exerted on the workpiece, the speed or efficacy of the EDM process is not affected by the hardness of workpiece but only its conductivity. This makes EDM ideal not only for machining hard materials such as hardened steel, carbides, and the like, but also for soft materials such as plastics and the like which might be distorted or damaged by the force exerted by traditional cutting tools.

EDM machines may be classified as either vertical or wirecut types. In both types, one terminal of a power supply is connected to a workpiece and the other terminal is connected to an electrode that generates controlled sparks of electricity to effect the removal of material from the workpiece. The workpiece and the electrode are immersed in a dielectric fluid, typically deionized water or a hydrocarbon, which acts as an electrical insulator until a given voltage differential is applied between the electrode and the workpiece. The electrode and workpiece are separated by a defined gap, and a D.C. voltage is applied therebetween to develop an electrical field across the gap. When the breakdown voltage of the dielectric is exceeded, the dielectric is ionized and an electrical current arcs across the gap striking the workpiece and vaporizing material from the surface thereof. As current continues to flow between the electrode and the workpiece, the intense heat developed melts additional material. The current is then pulsed off, the spark is quenched, and dielectric fluid flows into the heated zone to cool and solidify the melt and to transport some of the melt from the zone in the form of small chips or cinders. This cycle is repeated at frequencies of from about 500 to 1,000,000 pulses per second to effect formation of a cavity in the workpiece having a shape mirroring that of the electrode. A small portion of the melted material is redeposited onto the workpiece. However, this recast layer, as it is called, can be minimized by carefully controlling the pulsing of the current and the flow of the dielectric into the heated zone. Other than redeposits, EDM is a completely burr-free machining method.

The conventional or vertical EDM apparatus employs an electrode which is moved towards the workpiece. In contrast, the wirecut EDM variant employs a constantly moving wire as the electrode. Wirecut EDM is especially efficient because the wire erodes a thin line around the perimeter of the required cut rather than eroding the full volume of the cavity as in conventional EDM's. As in the conventional EDM process, the workpiece is typically mounted on a table with two degrees of freedom, i.e., in the X and Y directions. The wire is then threaded around the machine and through the workpiece material. The side of the wire acts like a bandsaw to cut though the workpiece material. However, in this case, the "tooth" of the saw is the electrical discharge and the "blade" is a wire, typically brass or another copper alloy, which can range in size from about a thousandth on up to twelve thousandths of an inch in diameter. As the wire approaches the workpiece, electrical discharges arc from the wire to effect the removal of material from the workpiece. The movement of the table is often computer controlled and automatically driven in a preprogrammed pattern to produce the desired shape. Once the cutting commences, the motion of the wire continually presents a new electrode to the workpiece and thereby lessens electrode wear. For additional information on EDM in general and wirecut EDM in particular, reference may be had to the following, the disclosures of which are expressly incorporated herein by reference: U.S. Pat. No. 4,463,241 and references cited therein; "Update: Wirecut EDM," EDM Digest, pp. 34–35, May/June 1984; and "Electrical Discharge Machining," TechCommentary, Vol. 3, No. 1, published by the Center for Metals Fabrication, Battelle Memorial Institute, Columbus. Ohio.

Although the wirecut EDM process mitigates the electrode wear associated with conventional or vertical EDM, the continuous motion of the wire electrode results in the consumption of significant quantities of brass wire or the like. For example, a machine shop having as few as three wirecut EDM machines may typically use 500 pounds or more of electrode wire each and every month. Handling the expended wire has heretofore presented a problem for such shops. That is, the wirecut EDM machines known in the art generally employ a pair of rollers or the like to teed the expended electrode wire into a container, receptacle, or the like. The randomly fed wire, however, ultimately tangles into a large ball necessitating the frequent emptying of the receptacle. In addition, the ball of tangled wire is seen as waste or scrap product which must be disposed of or salvaged for only a nominal value. Moreover, the expended wire as it is drawn from the machine requires constant attention to keep it from contacting the machine and causing a short circuit or from backing up and jamming or otherwise interfering with the drawing of the wire through the workpiece. Accordingly, it may be seen that improvements in wire handling capabilities would be well-received by the various industries such as tool and die, automotive, aerospace, medical, and the like which employ wirecut EDM processing.

Broad Statement of the Invention

The present invention is addressed to an apparatus for use in a wirecut EDM machine which is adapted for consolidating expended electrode wire by cutting it into predetermined lengths. By delivering the expended electrode wire into a receptacle or the like in a consolidated form, the present invention facilitates the handling of the wire in packing it more efficiently into the receptacle and in militating against roller jams, short circuits, and the like caused by the expended wire backing up and jamming or otherwise contacting the EDM machine. Moreover, the consolidated wire may be marketed as a processed material for use as a reinforcement, electromagnetic shielding, or the like commanding a market price appreciably higher than the salvage value of used electrode wire.

It is, therefore, a feature of the present invention to provide in a wirecut EDM machine having an advancing electrode wire, a wire driver assembly for advancing the electrode wire, and a roller assembly for drawing expended electrode wire from the EDM machine, an apparatus for consolidating the expended wire by cutting it into predetermined lengths as it is drawn from the machine. For cutting the expended wire, a wire shearing assembly having at least one shear tip movable along a predetermined locus is provided. The wire shearing assembly is actuable by a drive means to move the shear tip at a rate effective to cut the expended wire into predetermined lengths. A guide bushing having a guide opening extending therethrough is interposed between the roller assembly of the EDM machine and the wire shearing assembly to receive the expended wire from the roller assembly and to locate it within the locus for shearing impact with the shear tip.

It is also a feature of the invention to provide in a wirecut EDM machine an apparatus for consolidating expended wire which effects the cutting thereof into predetermined lengths without short circuiting the wire. For cutting the expended wire, a wire shearing assembly having at least one shear tip movable along a predetermined locus is provided. The wire shearing assembly is actuable by a drive means to move the shear tip at a rate effective to cut the expended wire into predetermined lengths. A guide bushing having a guide opening extending therethrough is interposed between the roller assembly of the EDM machine and the wire shearing assembly to receive the expended wire from the roller assembly and to locate it within the locus for shearing impact with the shear tip. To electrically insulate the apparatus from the EDM machine, a platform is interposed between the wire shearing assembly and the machine. The platform is configured to suspend the wire shearing assembly therefrom and is formed of a material which is electrically nonconductive. Support means fastenable to the housing and the EDM machine are provided for attaching the apparatus to the EDM machine.

It is also a feature of the invention to provide in a wirecut EDM machine an apparatus for cutting expended electrode wire. The apparatus includes a wire shearing assembly having at least one shear tip movable along a predetermined locus and a cutter having a peripheral portion for supporting the shear tip. The cutter is rotatable about a drive axis by a drive means to define the locus as a circle and to move the shear tip at a rate effective for sheafing the wire into predetermined lengths. A guide bushing having a guide opening extending therethrough is interposed between the roller assembly of the EDM machine and the wire shearing assembly to receive the expended wire from the roller assembly and to locate it within the locus for sheafing impact with the shear tip. To electrically insulate the apparatus from the EDM machine, a platform is interposed between the wire sheafing assembly and the machine. The platform is configured to suspend the wire sheafing assembly therefrom and is formed of a material which is electrically nonconductive. Support means fastenable to the housing and the EDM machine are provided for attaching the apparatus to the machine.

The invention, accordingly, comprises the apparatus possessing the construction, combination of elements, and arrangement of parts which are exemplified in the following detailed disclosure.

For a fuller understanding of the nature and objects of the invention, reference should be had to the following detailed description taken in connection with the accompanying drawings.

BRIEF DESCRIPTION OF THE DRAWINGS

FIG. 2 is an enlarged side elevational view of the apparatus for consolidating expended electrode wire of FIG. 1.

FIG. 3 is a cross-sectional view of the apparatus of FIG. 1 taken through the plane 3—3 of FIG. 2.

FIG. 5 is a top view of the cutter housing of the apparatus for consolidating expended electrode wire of FIG. 1.

FIG. 6 is an enlarged top view of the cutter housing of FIG. 5 showing a peripheral tip mount extension thereof with the shear tip removed.

FIG. 7 is an enlarged cross-sectional view of the cutter housing of FIG. 5 taken through plane 7—7 of FIG. 5.

FIG. 8 is an enlarged perspective view of the cutter housing of FIG. 5.

DETAILED DESCRIPTION OF THE INVENTION

Figure 1:
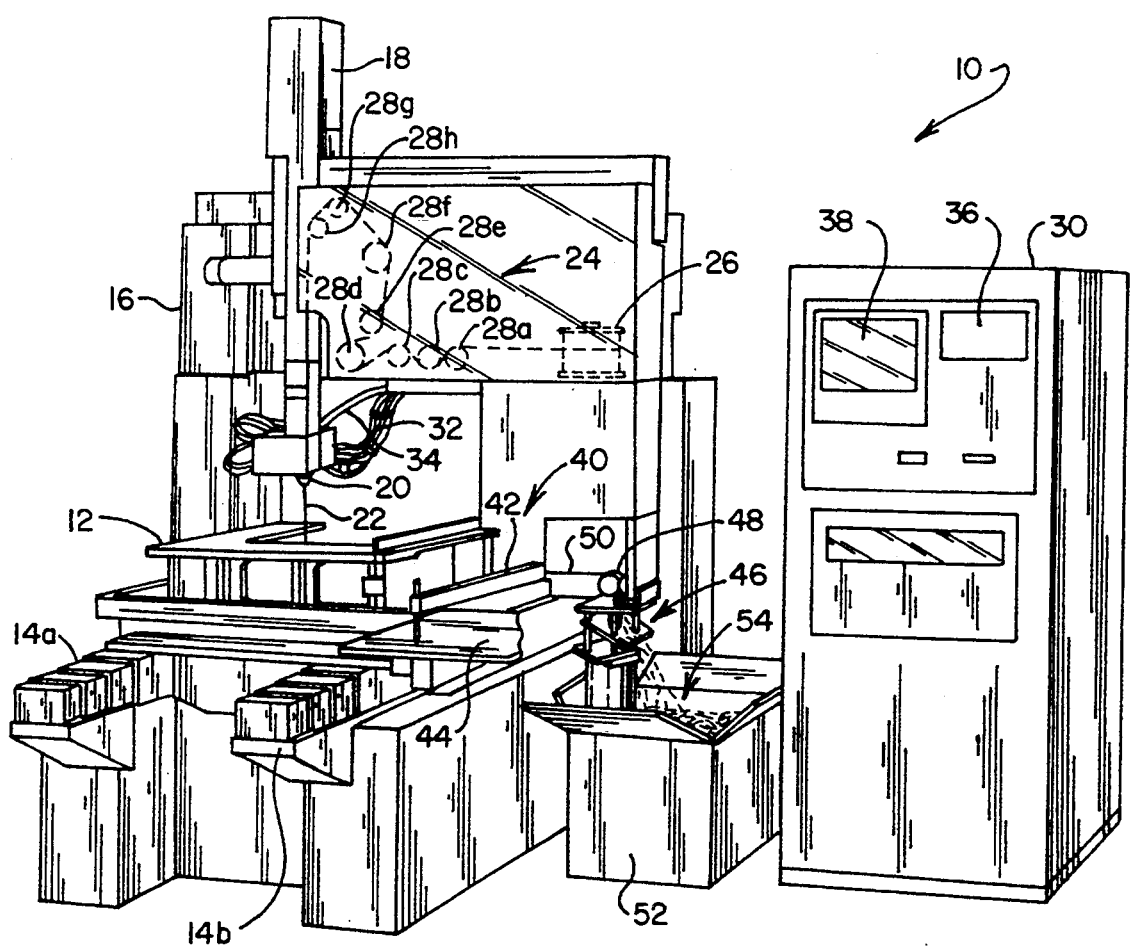
FIG. 1 shows a perspective view of a representative wirecut EDM machine in combination with an apparatus for consolidating expended electrode wire in accordance with the precepts of the present invention.

Referring to FIG. 1, a wirecut EDM machine adapted to remove material from a conductive workpiece with an electrode wire is shown generally at 10. A workpiece (not shown) is supported by a table, 12, which, preferably, is of an X-Y type to provide for movement of the workpiece in at least two directions along parallel supports 14a and 14b. A column, 16, supports a servo head, 18, having a die, 20, for the passage therethrough of an electrode wire, 22, which, depending on the workpiece and the machining program, may have a nominal diameter of from about a thousandth to about twelve thousandths of an inch. Electrode wire 22 is continually advanced through die 20 via a wire driver assembly, shown generally at 24. Wire driver assembly 24 may be seen to comprise a spool, 26, for holding a supply of electrode wire 22, and a system of tension and drive rollers, 28a–h. A controller, 30, is provided for controlling, via control lines 32, the advancing of electrode wire 22, the position of head 18, and the motion of table 12 in response to preprogrammed cutting instructions. Controller 30 also contains an internal power supply for providing a D.C. voltage to electrode wire 22 via a set of power lines, 34, as well as a keyboard, 36, and a display, 38, for the entering and viewing of input data. The validity of the input data may be determined in conjunction with a plotter assembly, shown generally at 40 to comprise a plotter arm, 42, and a plotting table, 44. Plotter assembly 40 allows a given set of cutting instructions to be executed in a plotted or printed form prior to the actual cutting of the workpiece. The accuracy of the cutting instructions can then be determined by comparison to the plot generated.

In accordance with the precepts of the present invention, a consolidation assembly, shown generally at 46, for consolidating electrode wire expended from EDM machine 10 by shearing it into predetermined lengths is provided in combination with EDM machine 10. Advantageously, consolidation assembly 46 is operated in conjunction with roller assembly 48 of EDM machine 10. That is, as electrode wire 22 is advanced by wire driver assembly 24 through the workpiece, expended or used electrode wire, 50, is drawn from EDM machine 10 by roller assembly 48. However, rather than randomly feeding expended wire 50 into receptacle 52 to form a tangled ball as has heretofore been common, wire shearing assembly 46 is provided to consolidate expended wire 50 by cutting or shearing it into predetermined lengths, as are shown at 54, for delivery into receptacle 52. Such a consolidation results in a more efficient packing of expended electrode wire 50 into receptacle 52 and thereby decreases the frequency at which receptacle 52 must be emptied. Moreover, wire lengths 54 have less of a tendency to jam or otherwise interfere with the advancing of electrode wire 22 through the workpiece or the drawing of expended wire 50 from EDM machine 10. In addition, lengths 54, due to the controlled length thereof, may be sold or marketed as a processed material having a value increased over that associated with mere scrap for use as reinforcement or electromagnetic shielding in concrete, plastics, composites, or the like.

Referring to FIG. 2, consolidation assembly 46 is shown in a somewhat enhanced detail revealing the orientation of its component parts. A guide bushing, 56, is provided to receive expended wire 50 as it is drawn from EDM machine 10 by roller assembly 48 and to locate wire 50 within the locus or cutting radius of a cutter wheel, shown generally at 60. For aligning guide bushing 56 with wire 50 as it is drawn from EDM machine 10 via roller assembly 48, an angled bracket, 62, and associated machine screw fastening members, three of which are shown at 63a–c, are provided for attaching a platform, 64, of consolidation assembly 46 to EDM machine 10. Referring momentarily to FIG. 3, it may be seen that bracket 62 may be adapted to provide for the adjustable positioning of consolidation assembly 46 with respect to roller assembly 48 via the integration of slots, two of which are represented at 65a and 65b, into bracket 62 for receiving fastening members 63.

Returning to FIG. 2 and looking momentarily to FIGS. 5, 6, and 7, cutter wheel 60 may be seen to comprise a planar, generally circular housing, 66, having a plurality of peripheral tip mount extensions, represented at 68, adapted to receive an associated shear tip, one of which is referenced at 70. Preferably, peripheral tip mount extensions 68 are provided with a V-shaped surface, 69, adapted to receive and retain a corresponding surface of shear tip 70 which extends to form an elongate portion, 71. Accordingly, it may be seen that tip 70 is thereby adapted for removable insertion into peripheral tip mount extensions 68 to facilitate sharpening or replacement when worn or damaged. Shear tip 70, preferably formed of a hardened material such as a carbide or the like, is provided with a peripheral, confronting shear surface, 72, for effecting the cutting or shearing of expended wire 50 and a shoulder portion, 73, for abutting engagement with housing 66.

For rotatably driving cutter wheel 60 about a drive axis, 75 (FIG. 3), such that shear tips 70 move along a generally circular locus, a drive motor, 74, preferably of a gear-type and having sealed bearings, is provided. A coupling, 76, joins a motor drive shaft, 78, of motor 74 to a cutter drive shaft, represented generally at 80, of cutter wheel 60 for the purpose of transmitting drive power from motor 74 to cutter wheel 60. Drive motor 74 is spaced-apart from platform 64 by a plurality of spacer members, 82a–d, two of which are shown at 82a and 82b, fastened to platform 64 and a plate, 84, which may be secured to motor 74 by a plurality of fastening members, 85a–d, as is shown at 85a and 85b. Preferably, spacer members 82 may be secured to platform 64 by fastening members, 86a–d, two of which are shown at 86a and b, which may be provided as, for example, cap screws inserted through platform 64 into threaded engagement with tapped holes (not shown) machined into the upper ends of spacer members 82. Likewise, spacer members 82 may be secured to plate 84 of motor 74 by fastening members (not shown) which may be provided as, for example, flat head machine screws counter sunk into the underside, 88, of plate 84 and threadably engaged with other tapped holes (not shown) machined into the lower ends of spacer members 82. To convey wire lengths 50 away from consolidation assembly 46, a generally planar, declining surface, 89, may be disposed below cutter wheel 60 for directing wire lengths expelled from cutter wheel 60 into a container, receptacle, hopper, or the like.

Continuing to FIG. 3, the internal structure of consolidation assembly 46 is now revealed. Platform 64 may be seen to be adapted to receive a wear or cutter plate, 90, preferably formed of a carbide, a hardened tool steel, or the like, which, in turn, is adapted for threadable engagement with guide bushing 56. For receiving wire 50 from roller assembly 48 and locating it with the locus of cutter wheel 60, bushing 56 is provided to have an opening extending therethrough, as is represented at 92, having a generally conical cross-section apexing towards cutter wheel 60. Cutter plate 90 has a corresponding passageway extending therethrough, as is represented at 94, for receiving wire 50 from bushing 56 and for forming an edge with a shearing surface, 96, of cutter plate 90. Looking momentarily to FIG. 4, it may be observed that as motor 74 rotatably drives cutter wheel 60 such that shear tips 70 thereof are moved along a generally circular locus, wire 50 is sheared between the edge of passageway 94 of cutter plate 90 and confronting shear surface 72 of shear tip 70.

Returning to FIG. 3 and looking additionally to FIGS. 7 and 8, it may also be observed that it is deskable to have an upper, bearing surface, 98, of tip 70 engage or bear upon shearing surface 96 of cutter plate 90 to cleanly severe rather than merely bend or deform wire 50. Accordingly, upper bearing surface 98 of tip 70 may be seen as extending above cutter wheel housing 66 to be biased into abutting engagement with shearing surface 96 of cutter plate 90. Inasmuch as bearing surface 98 of tip 70 is biased against shearing surface 96 of cutter plate 90, it is therefore preferable to balance cutter wheel 60 by providing it with at least two, diametrically-opposed shear tips. If more than two shear tips are provided, it is likewise preferable to equally space the tips about the circumference of cutter wheel 60 to thereby effect the balancing thereof. To enhance the durability of cutter plate 90 and especially that of shearing surface 96 thereof, cutter plate 90 is preferably formed of a hardened material such as tool steel or of an intrinsically hard material such as a carbide or the like.

To further promote the clean, non-deforming severance of wire 50 into predetermined lengths, it is also desirable that shear surface 72 of shear tip 70 perpendicularly confronts expended wire 50 as it is passed through passageway 94 of cutter plate 90 and into the circular locus of shear tips 70. Accordingly, shear surface 72 is preferably disposed orthogonally with respect to bearing surface 98 and shearing surface 96 of cutter plate 90. By assuring the production of straight, nondeformed wire lengths, the value of the lengths for use in the aforementioned secondary markets is enhanced.

To efficiently effect the transmission of drive power or torque from shaft 78 of motor 74 to cutter wheel 60, cutter drive shaft 80 is provided as having a generally elongate portion, 104, for insertion into coupling 76. Preferably, elongate portion 104 is provided with a keyway or the like for effecting a mechanical, torque-transmitting interlock with coupling 76. Likewise, motor drive shaft 78 is preferably provided with an externally threaded bushing, 106, configured for threaded engagement with internal threads, 108, of coupling 76. To secure bushing 106 to shaft 78, a tapped hole, represented at 110, may be machined through coupling 76 and bushing 106 and configured to receive a set crew or the like (not shown) effecting the mechanical engagement of motor shaft 78 and coupling 76.

For securing cutter drive shaft 80 within consolidation assembly 46 as it extends through platform 64, cutter plate 90, and cutter wheel 60, shaft 80 is provided with a shoulder portion, 111, for abutting engagement with platform 64, and a threaded portion, 112, adapted to receive, for example, a locknut, 114, a lock washer, 116, and a spring washer, 118, which abuttingly engage housing 66 of cutter wheel 60. Advantageously, locknut 114, lock washer 116, and spring washer 118 also serve to adjustably bias upper bearing surfaces 98 of shear tips 70 against shearing surface 96 of cutter plate 90. That is, by varying the torque applied to locknut 114 the force applied to cutter wheel housing 66 and, concomitantly, to bearing surfaces 98 of tips 70 may be proportionately controlled. Looking additionally to FIG. 4, cutter drive shaft 80 may be seen to also be provided with a spindle portion, 120, for retaining cutter wheel 60. Preferably, spindle portion 120 is provided with flat portions, 122a and b, for effecting the rotation of cutter wheel 60 as cutter drive shaft 80 is rotated by motor 74. Returning to FIG. 3, it may be seen that shaft 80, when driven by motor 74, rotates within platform 64 and cutter plate 90 about a generally cylindrical axle portion, 124, the rotation thereof which may be facilitated by the addition of a bushing, 126, which is preferably formed of a nylon material or the like to lessen frictional forces tending to impede the free rotation of shaft 80.

Given that a voltage is applied to electrode wire 22 and, accordingly, to expended electrode wire 50, it may be appreciated that it is desirable to electrically insulate guide bushing 56 and cutter wheel 60 from ground such that electrode wire 50 is not short circuited when contacting guide bushing 56 or cutter wheel 60 during consolidation. Accordingly, platform 64 is preferably formed from an electrically nonconductive material such as polyvinylchloride (PVC) or the like to electrically insulate consolidation assembly 46 from EDM machine 10. Moreover, it is also desirable to electrically insulate electrode wire 10 from motor 74 which, by necessity, is grounded to an AC power source or the like. Accordingly, spacer members 42 and coupling 76 are preferably formed of an electrically nonconductive material such as nylon or the like. Additionally, an insulative gap, as is represented at 130. is provided to insulate motor 74 and motor shaft 78 from cutter wheel shaft 80 and, accordingly, from cutter wheel 60 and wire 50.

Figure 4:
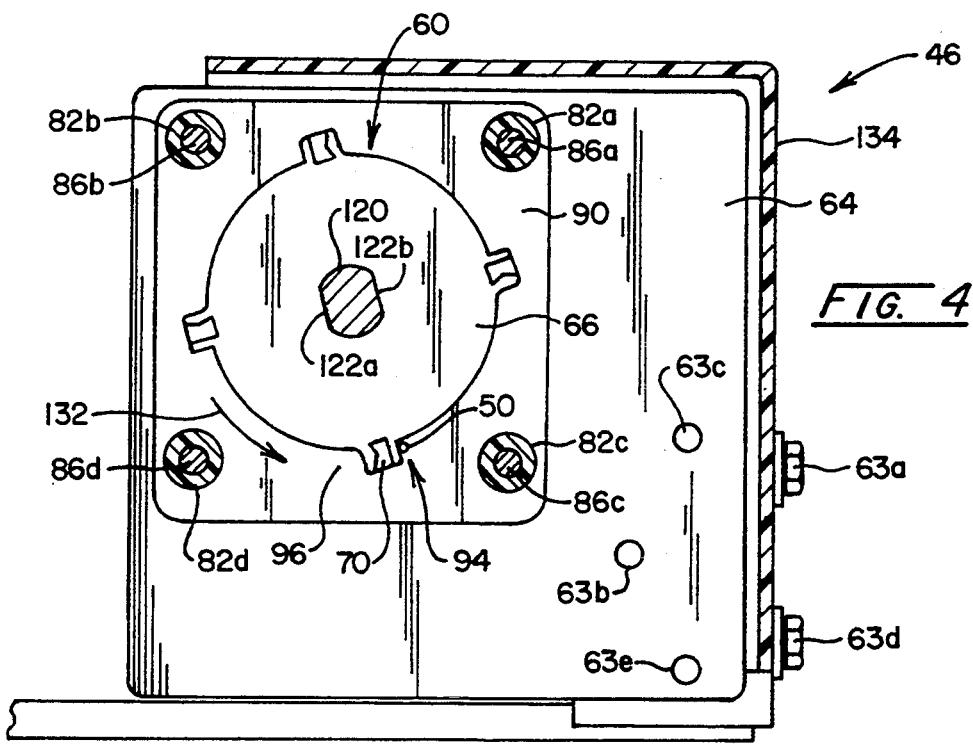
FIG. 4 is a cross-sectional view of the apparatus of FIG. 1 taken through the plane 4—4 of FIG. 3.

Referring to FIG. 4 in conjunction with FIGS. 1, 2 and 3, the general operation of consolidation assembly 46 may be considered. Essentially, the rotation of cutter drive shaft 80 in general and of spindle portion 124 in particular, effected by the rotation of motor drive shaft 78 and coupling 76, rotatably cutter wheel 60 and moves shear tips 70 along a generally circular locus about drive axis 75 as indicated by the arrow represented at 132. Concurrently with the movement of shear tips 70 along locus 132, expended electrode wire 50 is drawn by roller assembly 48 from EDM machine and into guide bushing 56 of consolidation assembly 46. As wire 50 is drawn through guide bushing 56 and passageway 94 of cutter plate 90 and is located within shear tip locus 132, it is sheared into predetermined lengths 54 between the edge formed by passageway 94 and shearing surface 96 of cutter plate 90 and confronting shear surface 72 of shear tip 70. Sheared lengths 54 are thereafter expelled from cutter wheel 60 along a tangent to the circular periphery of cutter wheel 60 by a force imparted thereto by tips 70. Once expelled from cutter wheel 60, sheared lengths 54, having substantially enhanced utility and salvage value, are gravity-fed down declined surface 89 and into receptacle 52. To protect operators and the like in the immediate vicinity of EDM machine 10 and to militate against wire accumulation within consolidation assembly 46, a shield, 134, preferably formed of a transparent material such as a polyacetate or the like, may be provided to enclose consolidation assembly 46.

Considering the operational variables of consolidation assembly 46, it may be desirable from marketing perspective to shear expended wire 50 into lengths ranging from about ⅜ to ½ inch for sale as electromagnetic shielding, with a length of ⅜ inch being preferred. Accordingly, a practitioner of the present invention, given an expended wire speed as determined by the particular EDM machine employed and the particular workpiece of interest, may select an appropriate cutter wheel and drive motor as determined by the relationship:

$$l = \frac{v}{n\omega} \quad (1)$$

where l is the length of the consolidated wires, v is the speed of the expended wire drawn from the EDM machine, n is an integer representing the number of shear tips, and ω is the rotational speed of the drive motor in revolutions per unit time. That is for a given or optimum wire speed, the practitioner may vary, for example, the rotational speed of the drive motor or the number of shear tips to achieve a desired wire length. The practitioner may also select a drive motor having an appropriate horsepower rating to develop the torque necessary to rotate the cutter wheel at the desired revolution rate as determined by the mass and radius of the cutter wheel. For example, given a steel cutter wheel having a nominal diameter of about 3 inches, a nominal thickness of about ¼ inch, and 4 shear tips, a 1/20 horsepower motor operating at 154 rpm at 60 Hz is satisfactory to shear a 0.004 to 0.012 inch nominal diameter brass wire into ⅜ to ½ inch lengths.

It is anticipated that certain changes may be made in the above-described apparatus without departing from the scope of the invention herein involved. For example, although the present invention has been illustrated in connection with the utilization of a cutter wheel driven along a generally circular by a drive motor, it is within the precepts of the present invention that other consolidation assemblies movable along other predetermined locii would be equally efficacious in combination with an EDM machine for effecting electrode wire consolidation. Thus, a reciprocating blade movable along a generally linear locus by a piston, solenoid, or the like, for example, is foreseeable as a design option within the purview of a practitioner in light of the instant disclosure. Accordingly, it is intended that all matter contained in the description of the above-described invention or shown in the accompanying drawings shall be interpreted as illustrative and not in a limiting sense.

What is claimed:

1. In a wirecut EDM machine having an advancing electrode wire, a wire driver assembly for advancing said electrode wire, and a roller assembly for drawing expended electrode wire from said EDM machine, apparatus for consolidating said expended wire comprising:

a wire shearing assembly having at least one shear tip movable along a predetermined locus and actuable to move said at least one shear tip at a rate effective for shearing said wire into predetermined lengths;

a guide bushing interposed between said roller assembly and said wire shearing assembly and having a guide opening extending therethrough for receiving said wire from said roller assembly and locating said wire within said locus for shearing impact with said at least one shear tip;

a cutter plate adapted to receive said guide bushing and having a shearing surface and a passageway extending from said guide opening to said shearing surface for receiving said wire from said guide bushing and orienting it generally normal to said shearing surface;

a biasing assembly for biasing said at least one shear tip against said shearing surface; and a drive assembly for actuating said wire shearing assembly to move said shear tip at said effective rate.

2. The apparatus of claim 1 further comprising a generally planar ramp surface disposed below said wire shearing assembly and declined with respect thereto for conveying said sheared wire from said apparatus.

3. The apparatus of claim 1 wherein said wire shearing assembly comprises a cutter having a peripheral portion supporting said at least one shear tip and rotatable about a drive axis to define said locus as a circle, said at least one shear tip having both a beating surface slideably engagable with said cutter plate shearing surface and a shear surface confronting said wire.

4. The apparatus of claim 3 wherein the length of said predetermined lengths of said electrode wire is determined from the relationship:

$$l = \frac{u}{n\omega}$$

where l is the length of said predetermined lengths of said electrode wire, u is the speed of said expended wire drawn from said EDM machine, v is an integer representing the number of said at least one shear tip, and $\omega$ is the rotational speed of a said shear tip in revolutions per unit time.

5. The apparatus of claim 3 wherein said cutter comprises a housing rotatable about said drive axis having at least two, equally-spaced tip mount extensions forming said peripheral portion, each said tip mount extension configured to receive a said shear tip.

6. The apparatus of claim 5 wherein said drive assembly further comprises a drive shaft engaging and extending through said cutter housing along said drive axis and rotatable about said axis to rotate said cutter housing and move each said shear tip along said predetermined locus.

7. The apparatus of claim 6 wherein said drive shaft has a threaded portion and said assembly for biasing each said shear tip against said cutter plate shearing surface comprises:

a nut configured for threadable engagement with said drive shaft threaded portion and movable along said threaded portion for adjustably biasing each said shear tip beating surface against said cutter plate shear surface; and a spring member interposed between said nut and said cutter housing and compressible against said cutter housing by said nut for urging each said shear tip bearing surface into abutting engagement with said cutter plate shearing surface.

8. The apparatus of claim 5 wherein each said shear tip bearing surface extends above said cutter housing.

9. The apparatus of claim 5 wherein each said shear tip shear surface is disposed normal to said cutter plate shearing surface.

10. In a wirecut EDM machine having an advancing electrode wire, a wire driver assembly for advancing said electrode wire, and a roller assembly for drawing expended electrode wire from said EDM machine, apparatus for consolidating said expended wire comprising:

an electrically-conductive wire shearing assembly having a shear tip movable along a predetermined locus and actuable to move said shear tip at a rate effective for shearing said wire into predetermined lengths;

a guide bushing interposed between said roller assembly and said wire shearing assembly and having a guide opening extending therethrough for receiving said wire from said roller assembly and locating said wire within said locus for shearing impact with said shem tip;

an electrically-conductive cutter plate adapted to receive said guide bushing and having a shearing surface and a passageway extending from said guide opening to said shearing surface for receiving said wire from said guide bushing and orienting it generally normal to said shearing surface;

a biasing assembly for biasing said shear tip against said shearing surface;

a drive assembly for actuating said wire shearing assembly to move said shear tip at said effective rate;

a platform interposed between said cutter plate and said EDM machine and configured to suspend said apparatus therefrom, said platform being formed of a material which is electrically nonconductive to electrically insulate said apparatus from said EDM machine; and a support fastenable to said platform and said EDM machine for attaching said apparatus to said EDM machine.

11. The apparatus of claim 10 wherein said drive assembly comprises a drive motor electrically insulated from said electrode wire and having an upstanding motor drive shaft.

12. The apparatus of claim 11 wherein said drive assembly further comprises:

a wire shearing assembly drive shaft coupled to said wire shearing assembly and coaxially aligned with said motor drive shaft for actuating said wire shearing assembly to move said shear tip along said predetermined locus; and a coupling joining said motor drive shaft to said wire shearing assembly drive shaft for transmitting drive power from said motor drive shaft to said wire shearing assembly drive shaft, said coupling being formed of a material which is electrically nonconductive.

13. The apparatus of claim 11 further comprising spacer members disposed intermediate and attached to said platform and said drive motor for suspending said drive motor a predetermined distance from said platform.

14. The apparatus of claim 13 wherein said spacer members are formed of a material which is electrically nonconductive.

15. In a wirecut EDM machine having an advancing electrode wire, a wire driver assembly for advancing said electrode wire, and a roller assembly for drawing expended electrode wire from said EDM machine, apparatus for consolidating said expended wire comprising:

a wire shearing assembly comprising:

at least one shear tip movable along a predetermined locus; and a cutter having a peripheral portion for supporting said at least one shear tip and rotatable about a drive axis to define said locus as a circle and to move said at least one shear tip at a rate effective for shearing said wire into predetermined lengths;

a guide bushing interposed between said roller assembly and said wire shearing assembly and having a guide opening extending therethrough for receiving said wire from said roller assembly and locating said wire within said locus for shearing impact with said at least one shear tip;

a cutter plate adapted to receive said guide bushing and having a shearing surface and a passageway extending from said guide opening to said shearing surface for receiving said wire from said guide bushing and often it generally normal to said shearing surface;

a biasing assembly for biasing said at least one shear tip against said shearing surface;

a drive assembly for rotating said cutter to move said at least one shear tip at said effective rate;

a platform positioned between said cutter plate and said EDM machine and configured to suspend said apparatus therefrom, said platform being formed of a material which is electrically nonconductive to electrically insulate said apparatus from said EDM machine; and a support fastenable to said platform and said EDM machine for attaching said apparatus to said EDM machine.

16. The apparatus of claim 15 wherein:

said cutter comprises a housing rotatable about said drive axis having at least two, equally-spaced tip mount extensions forming said peripheral portion, each said tip mount extension configured to receive a said shear tip; and each said shear tip has a shear surface confronting said wire and a bearing surface extending above said cutter housing and slideably engagable with said cutter plate shearing surface.

17. The apparatus of claim 16 wherein said drive assembly comprises:

a drive motor electrically insulated from said electrode wire and having an upstanding motor drive shaft;

a wire shearing assembly drive shaft coupled to said cutter housing and coaxially aligned with said motor drive shaft for rotating said cutter to move each said shear tip along said predetermined locus; and a coupling joining said motor drive shaft to said wire shearing assembly drive shaft for transmitting drive power from said motor drive shaft to said wire shearing assembly drive shaft, said coupling being formed of a material which is electrically nonconductive.

18. The apparatus of claim 17 further comprising spacer members disposed intermediate and attached to said platform and said drive motor for suspending said drive motor a predetermined distance from said platform.

* * * * *